(12) United States Patent
Ofori

(10) Patent No.: US 10,259,023 B2
(45) Date of Patent: Apr. 16, 2019

(54) PROCESSING BASKET AND PROBES DISPOSABLE UTILITY LINING SYSTEM

(71) Applicant: Jones Ofori, Ontario, CA (US)

(72) Inventor: Jones Ofori, Ontario, CA (US)

( * ) Notice: Subject to any disclaimer, the term of this patent is extended or adjusted under 35 U.S.C. 154(b) by 130 days.

(21) Appl. No.: 15/606,385

(22) Filed: May 26, 2017

(65) Prior Publication Data
US 2017/0341116 A1    Nov. 30, 2017

Related U.S. Application Data

(60) Provisional application No. 62/343,257, filed on May 31, 2016.

(51) Int. Cl.
| | |
|---|---|
| *B09B 3/00* | (2006.01) |
| *B08B 17/04* | (2006.01) |
| *B65D 25/16* | (2006.01) |

(52) U.S. Cl.
CPC ............ *B09B 3/0075* (2013.01); *B08B 17/04* (2013.01); *B09B 3/00* (2013.01); *B65D 25/16* (2013.01); *B09B 3/0016* (2013.01)

(58) Field of Classification Search
CPC ....... B09B 3/0075; B09B 3/00; B09B 3/0016; B08B 17/04; B08B 17/02; B65D 25/16; B65D 25/18; B65D 25/14; B65D 21/0233; B65D 37/00
USPC ............. 220/495.06, 495.01, 23.87, 9.4, 9.1; 414/222.12, 222.09, 226.05
See application file for complete search history.

(56) References Cited

U.S. PATENT DOCUMENTS

| | | | | |
|---|---|---|---|---|
| 3,837,772 | A * | 9/1974 | Van de Walker | B29C 45/14 414/627 |
| D320,442 | S | 10/1991 | McKay | |
| 5,153,950 | A | 10/1992 | Sowers | |
| 6,338,171 | B1 | 1/2002 | Dandridge | |
| D604,813 | S | 11/2009 | Morris | |
| 2004/0241041 | A1* | 12/2004 | Woodworth | A61J 1/1406 422/22 |

FOREIGN PATENT DOCUMENTS

CA          2347514 A1 * 12/2001    ......... B01D 11/0203

* cited by examiner

*Primary Examiner* — Robert J Hicks
(74) *Attorney, Agent, or Firm* — Kirk A. Buhler; Buhler & Associates

(57) ABSTRACT

Improvements in a processing basket lining system for slide maker-stainer instrument. The utility liner is configured to sit on top of the processing baskets that are customarily occupied/filled with the processing reagents. The probe jackets are shaped to slip in and out without interfere with its capacity to dispense-drain reagents while submerged to the intended reagents in the processing baskets. The liners provide a surface between the processing baskets or probes and the reagents where debris can accumulate as a waste by-product of the process largely in quantities or simply just by the length of use time. The disposable utility lining system, processing basket and probe cover are disposable. The liners are preferably made of plastics. The material of choice is tested not to react with the processing reagent for a period of time, depending on the manufacturer's maintenance requirement.

16 Claims, 12 Drawing Sheets

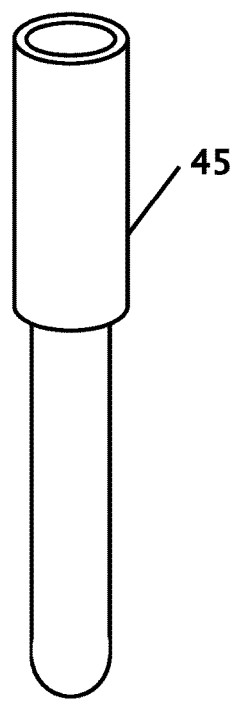
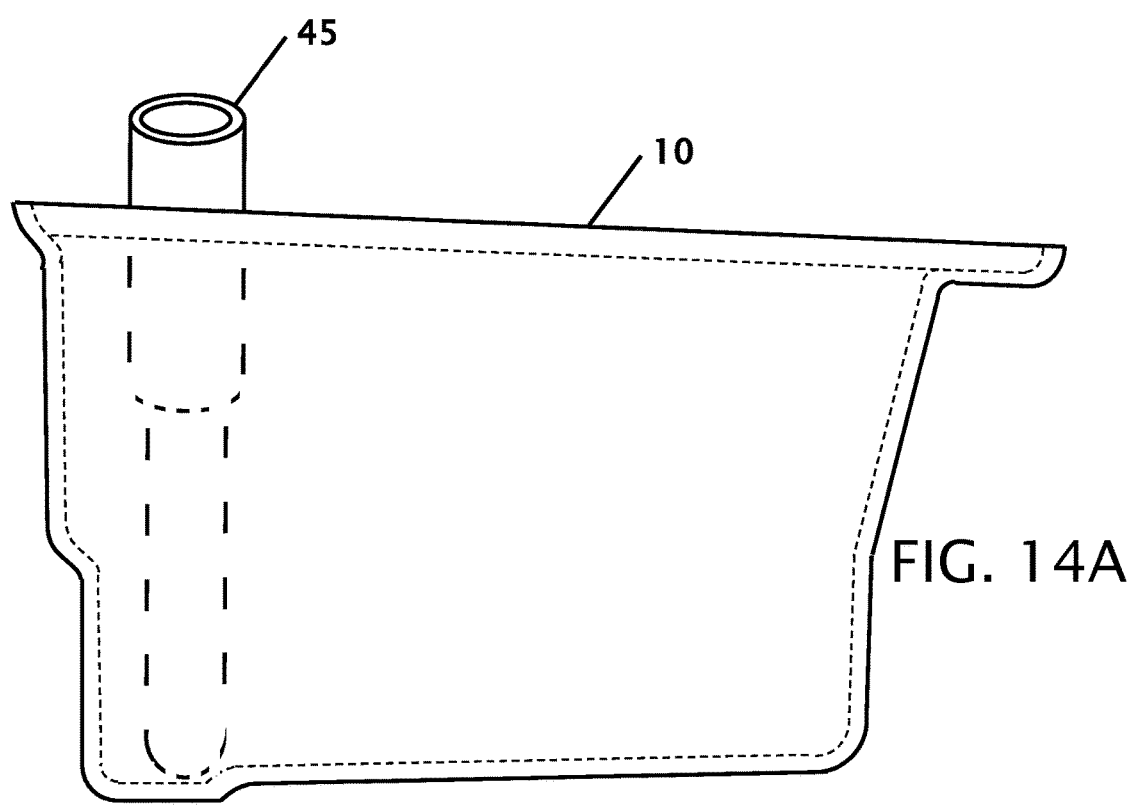
FIG. 14
FIG. 14A

PROCESSING BASKET AND PROBES DISPOSABLE UTILITY LINING SYSTEM

CROSS REFERENCE TO RELATED APPLICATIONS

This application claims the benefit of Provisional Application Ser. No. 62/343,257 filed May 31, 2017 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in healthcare waste management and disposal. More particularly, the processing basket and probe disposable utility lining system comprises a disposable lining system that replaces and enhances manual cleaning and renders the daily maintenance of the laboratory slide maker-stainer (SMS) instrument less precarious to reduce exposure to harmful carcinogenic chemicals and waste disposal.

Description of Related Art Including Information Disclosed Under 37 CFR 1.97 and 1.98

To comply with the Occupational Safety and Health Standards 1910.120 App C and Environment Protection Agency Hazardous Waste Standard, healthcare wastes (biological and chemical) becomes serious category parallel to hazardous, toxic, flammables and carcinogenic. Year after year, healthcare personnel are required to update themselves with the management and disposal of hazardous chemicals/waste with the current regulations annually. Day after day, healthcare workers conducted day to day cleaning of the instruments and its parts, in which the safety improves in time with the presence of required personal protective gears. Due to unpredictable exposure of the workers to chemical and biological products, the concept of liners has been embraced in the healthcare industry for more than a decade now. With stricter regulations regarding management and disposal of the hazardous chemicals/waste and reagents, usage of liners becomes something healthcare industry specifically clinical laboratory are mandated to utilize. One of the best example of healthcare liners is the red, yellow, blue and transparent to white waste bin/container lining system. They are color coded plastic bags placed to the waste containers which represents/dictates the kind of waste the color-coded plastic bag is intended to hold, its handling and its discard as defined by each specific institution.

This disposable lining system has not been applied in the reagent basket and probes of the slide maker-stainer instrument in the clinical laboratory due to its freshness in the market. Slide maker-stainer instrument was built and is being utilized in high volume clinical laboratory to make blood smears automatically and stain the fully made blood smear as it goes through the built system of process in designated baskets which includes, but is not limited to, fixing solutions, buffering, staining, rinsing, drying and stained-dried blood slide smear are the finished product ready to be read and evaluated by the licensed Clinical Laboratory Scientist for those patients who qualify to the criteria defined specifically. The probe on the other hand is dipped on the higher end of the basket and play the role in draining and filling up the baskets of the reagents it is defined to hold to carry out the intended process. It is the function of the probes to fill replenishment reagents to the set volumes required to each processing and drain old reagents to waste. It is the duty of the designated laboratory personnel to perform daily maintenance involving cleaning of the baskets and probes which system process have been designed to be in contact with biological samples (blood) and defined but would not be limited to multiple reagents with each corresponding Material Safety Data Sheets (MSDS) definitions.

Sharing the same principle as the color-coded waste liners, the processing disposable utility lining system seeks to provide a convenient and safer way of cleaning the processing baskets and probes by possibly minimizing or eliminating unpredictable exposure of the laboratory personnel that works, maintains and troubleshoots this piece of equipment slide maker-stainer (SMS).

U.S. Pat. No. 6,338,171 issued on Jan. 15, 2002 to N. Dawn Dandridge discloses a Sink Hugger. The Sink Hugger is a removable protective liner for use with a sink mounted in a counter top. The liner comprises a bottom panel of a size that conforms to the bottom of the sink, four upstanding side panels which conform to the upstanding walls of the sink and an adjacent portion of its peripheral flange. While the sink hugger provides a coating for the sink, it does not include a screen for retaining slides.

What is needed is a processing basket and probes disposable utility lining system is a disposable lining system that replaces and enhances manual cleaning and renders the daily maintenance of the laboratory slide maker-stainer (SMS) instrument less precarious. The processing basket and probe disposable utility lining system disclosed in this document provides the answer.

BRIEF SUMMARY OF THE INVENTION

It is an object of the processing basket and probe disposable utility lining system to include a utility baskets liner and probe jacket disposable in category intentionally for reagents/waste process normally but not limited to a slide maker-stainer (SMS) instrument.

It is another object of the processing basket disposable utility lining system for the utility liner to be configured to generally sit on top of the basket that holds the reagents, including but not limited to, fixative, buffer, stains and rinsing solution where a robotic arm usually delivers the supposedly made dried slides for the staining process to accomplish.

Sharing the same principle, it is an object of the probe jacket disposable lining system to easily slip into and out from the probe.

It is still another object of the processing basket disposable utility lining system to preferably assume the shape of the basket that commonly won't interfere with the instrument's robotic arms function designed to deliver the slide to the intended processing receptacle.

The probes jacket is intended to be slipped into the probe as a covering as it performs its intended function of filling up and draining reagents to the baskets. It is an important object of the probe jacket disposable lining system tightly enough to stay slipped in while the probe is submerged to the utility basket and the reagents is it designed to hold.

The materials of choice are preferably moldable but not limited to plastics made to NOT react with the reagents and its base component chemically so that the original quality of the end product of stained slide for scientific review, evaluation and reading is not lost.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 14 is a perspective view, showing the dispense probe with the cover.

FIG. 14A is the right-side view of a preferred embodiment showing the dispense/fill probe cover assembly with the dispense/fill probe with cover dipped in the basket.

DETAILED DESCRIPTION OF THE INVENTION

Reference Numbers in the Figures 10 processing basket.
20 basket utility liner.
21 lip.
29 alternative embodiment basket utility liner.
30 slide cassette.
31 slide.
32 robotic arm.
40 cover.
45 fill probe.
50 drain probe.

Medical instruments require daily maintenance of draining old and/or used reagents, and commonly replace the basket with a clean set, if available, and refill the basket with new reagents. Laboratory personnel will then clean the old set of baskets with methanol, dry the baskets and prepared for the next maintenance cycle. On occasion, when a second set of baskets are not available, the recently cleaned baskets will be placed back for use. The probes are dried and wiped clean with methanol to get rid of any residue that forms between cleaning cycles/periods that could interfere in the reading of the stained slides that could compromise the test results.

Figure 1:
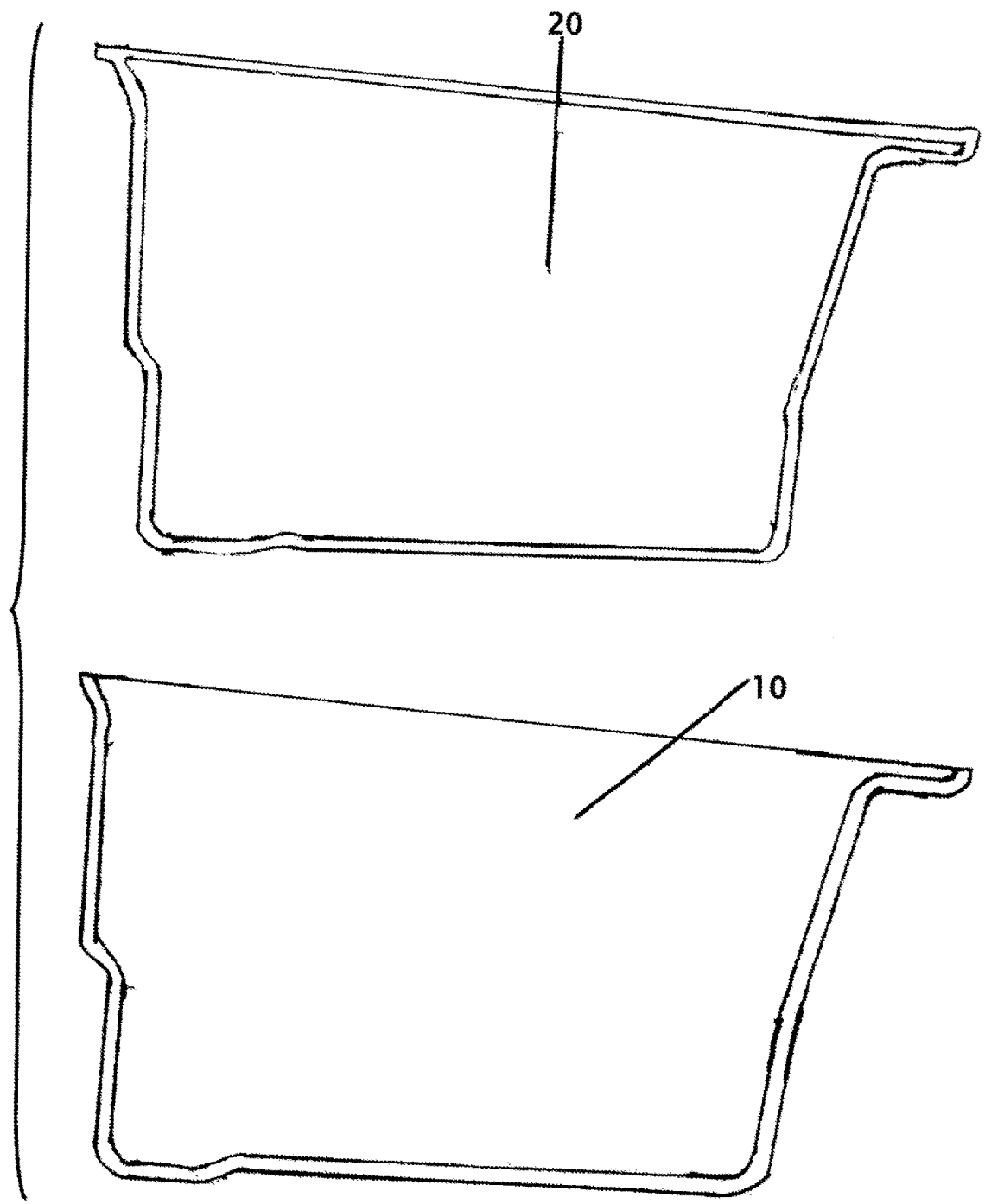
FIG. 1 is a side view, showing the slide cassette assembly with the utility liner separated from the processing basket.

FIG. 1 shows the preferred embodiment of the basket utility liner 20 separated from the processing basket. The basket utility liner 20 is ideally a thin, molded liner that mimics the interior contour of a sink and sits inside the processing baskets 10. The molded liner is between 0.002 and 0.020 inches thick. The current basket utility liner 20 allows holding of filled reagents during processing. This processing basket utility liner 20 is configured to sit on a bar holder that is customarily occupied by numerous processing basket units.

Figure 2:
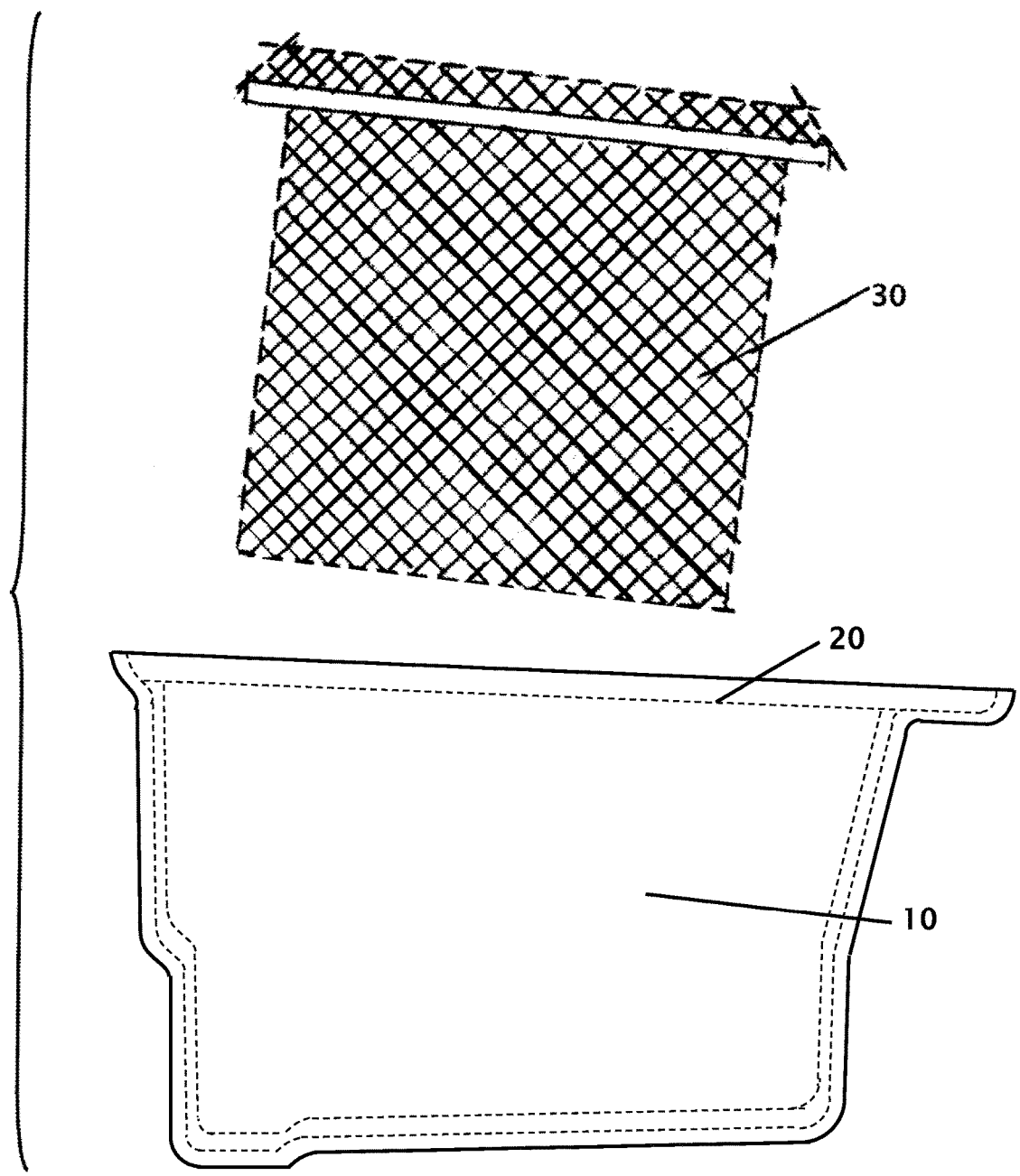
FIG. 2 is a side view, showing the slide cassette assembly with the utility liner and the processing basket separated from the slide rack containing smears of slides.

FIG. 2 shows an example of the assembled features of the processing basket 10 and the basket utility liner 20 and the processing basket separated from the slide rack containing smears of slides that are customarily filled with slide processing-staining reagents. The slide cassette 30—a smear assembly is generally accessible for the robotic arm to be transported to each processing baskets 10 where it is placed in the basket utility liner 20 assembly.

Figure 3:
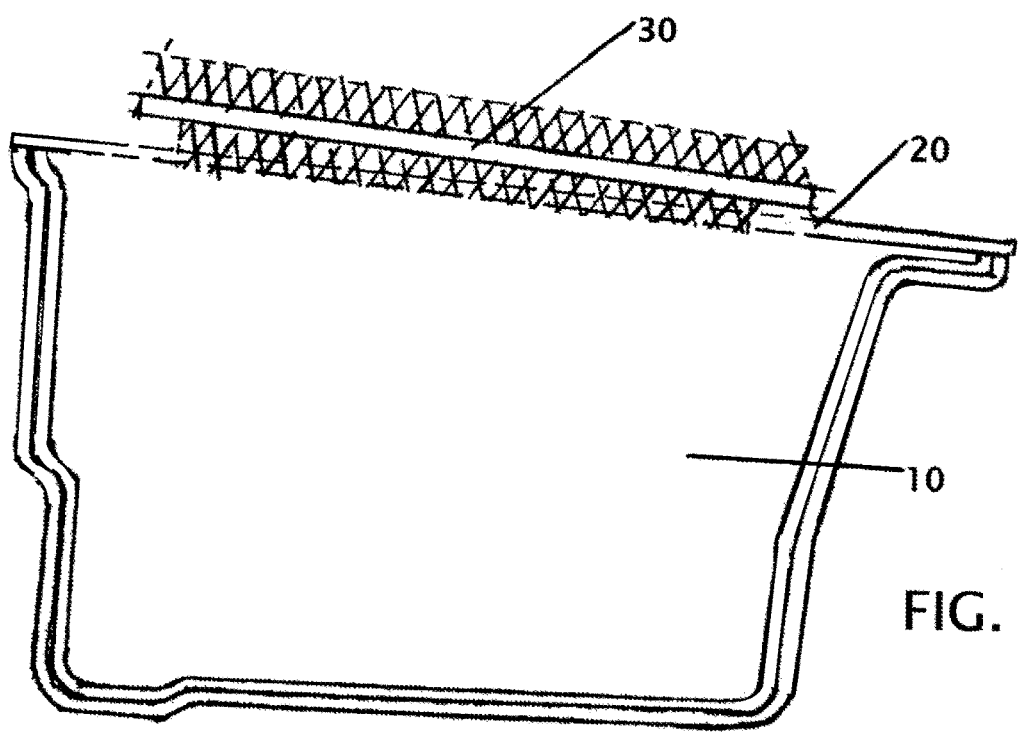
FIG. 3 shows a side view of the processing basket disposable utility lining system in an assembled state.

FIG. 3 shows a side view of the processing basket disposable basket utility lining system in an assembled state. Processing basket 10 includes the basket utility liner 20 with a slide cassette 30 inside and the slide smears. The assembled unit is customarily filled with slide processing-staining reagents, that are generally accessible with a robotic arm of the instrument to intentionally dip the slide cassettes with slide smears attached for processing.

Figure 4:
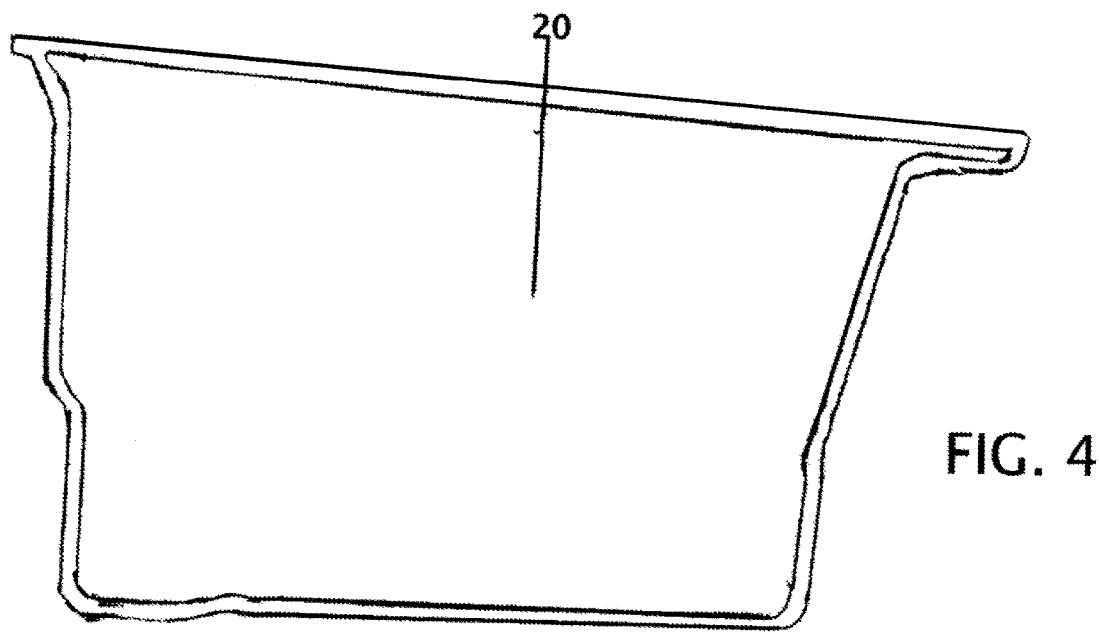
FIG. 4 is a side view, showing the basket utility liner.
Figure 5A:
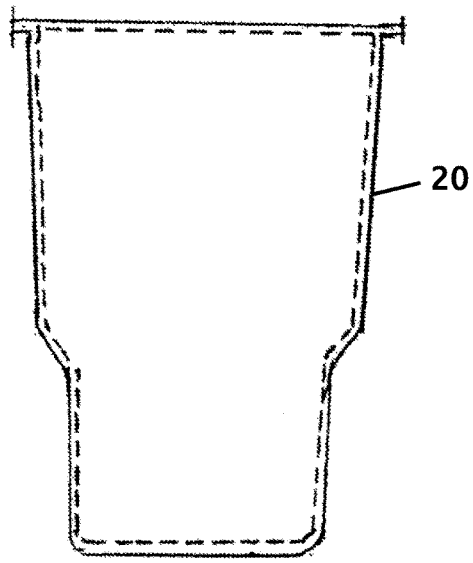
FIG. 5A is a tall side end view showing basket utility liner.
Figure 5B:
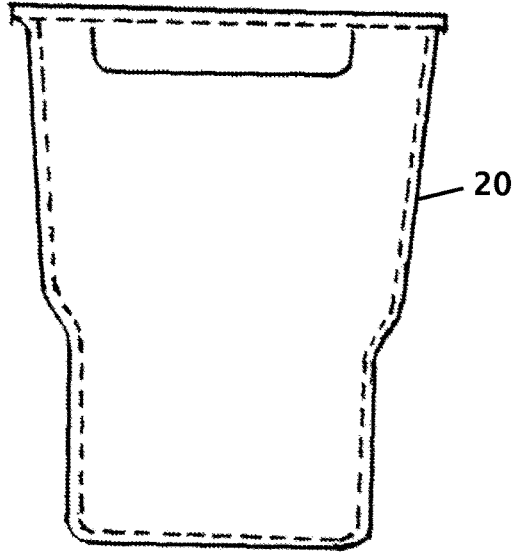
FIG. 5B is a short side end view showing basket utility liner.

FIG. 4 is a side view, showing the basket utility liner, 5A is a tall side end view showing basket utility liner 20 and FIG. 5B is a short side end view showing basket utility liner 20.

Figure 6:
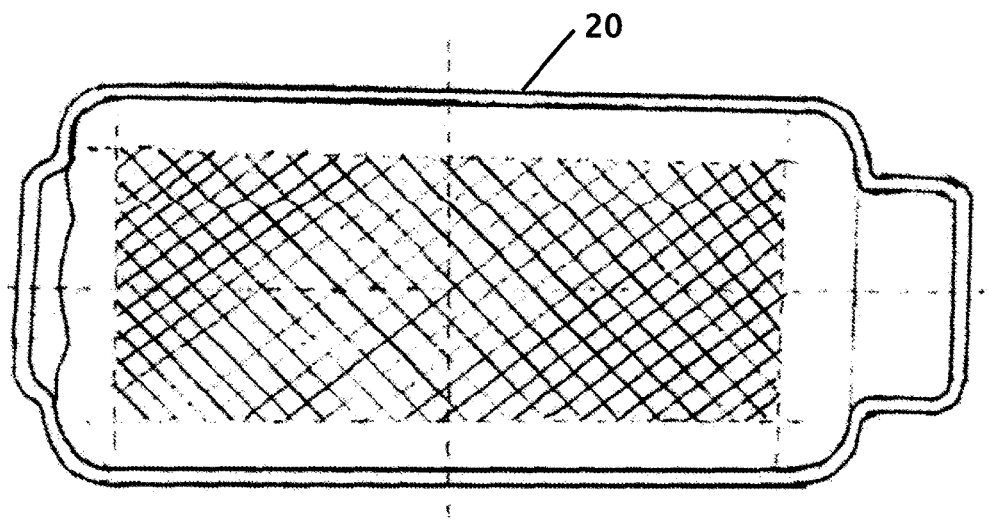
FIG. 6 shows a top perspective view of the basket utility liner on the slide cassette assembly.
Figure 7:
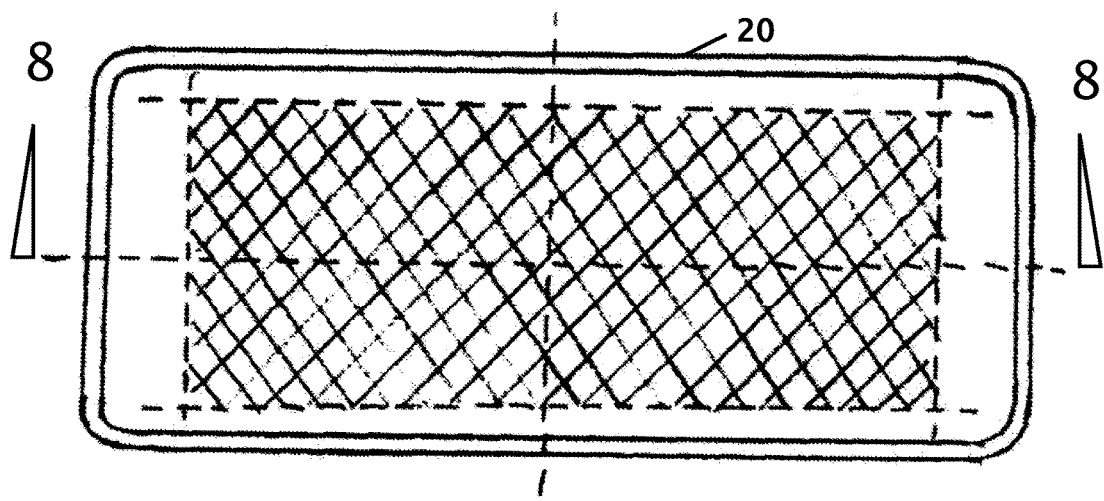
FIG. 7 is a perspective view, showing the bottom view of the basket utility liner.
Figure 8:
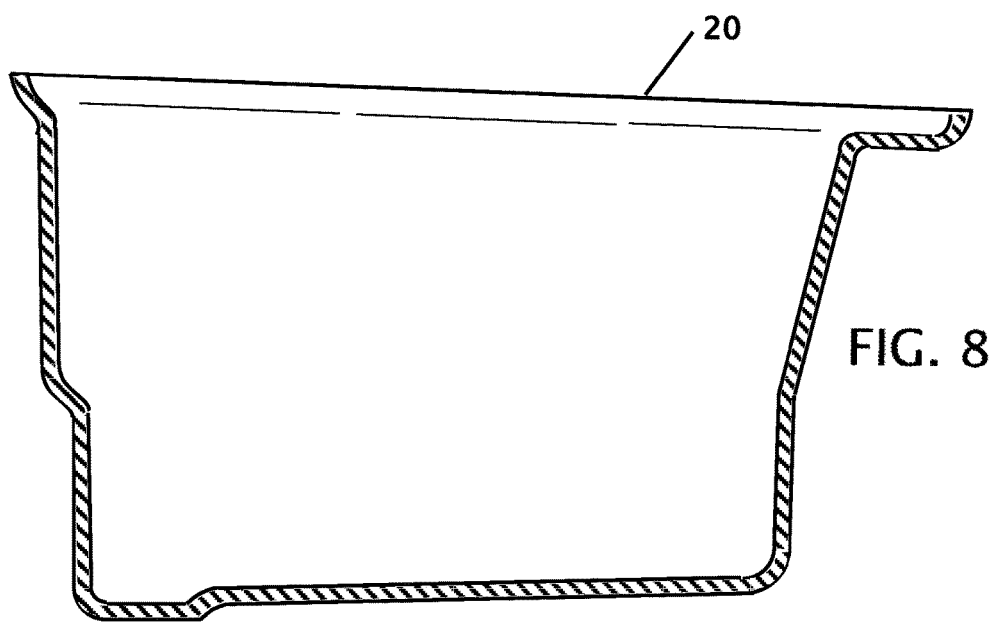
FIG. 8 shows a cross-sectional view of the basket utility liner dissected cut through section 8-8 from FIG. 7.

FIG. 6 shows a top perspective view of the basket utility liner 20 on the slide cassette assembly, FIG. 7 is a perspective view, showing the bottom view of the basket utility liner 20 and FIG. 8 shows a cross-sectional view of the basket utility liner 20 dissected cut through section 8-8 from FIG. 7.

Figure 9A:
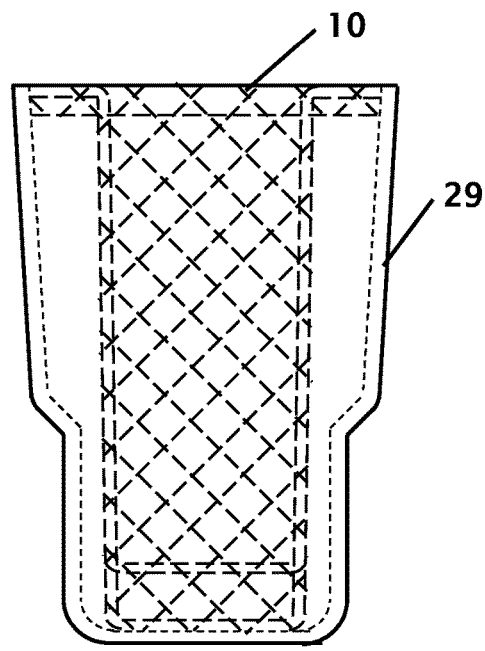
FIG. 9A-9C are perspective views of another contemplated embodiment to the basket utility liner.
Figure 9B:
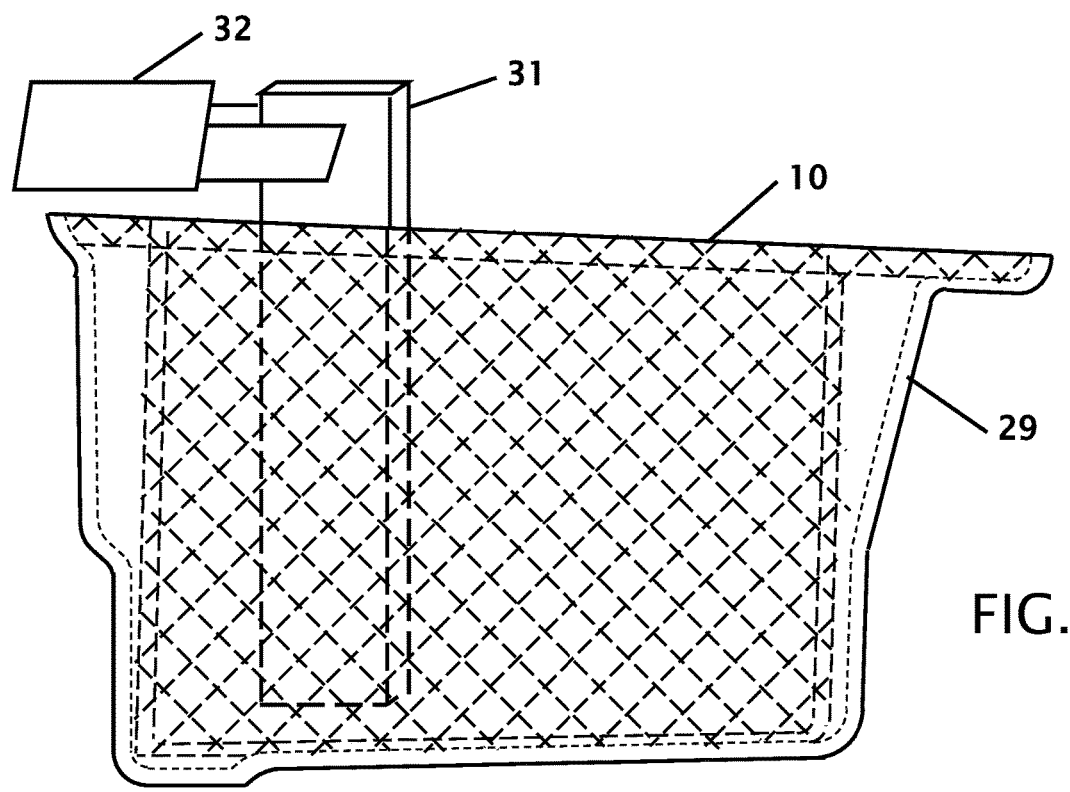
Figure 9C:
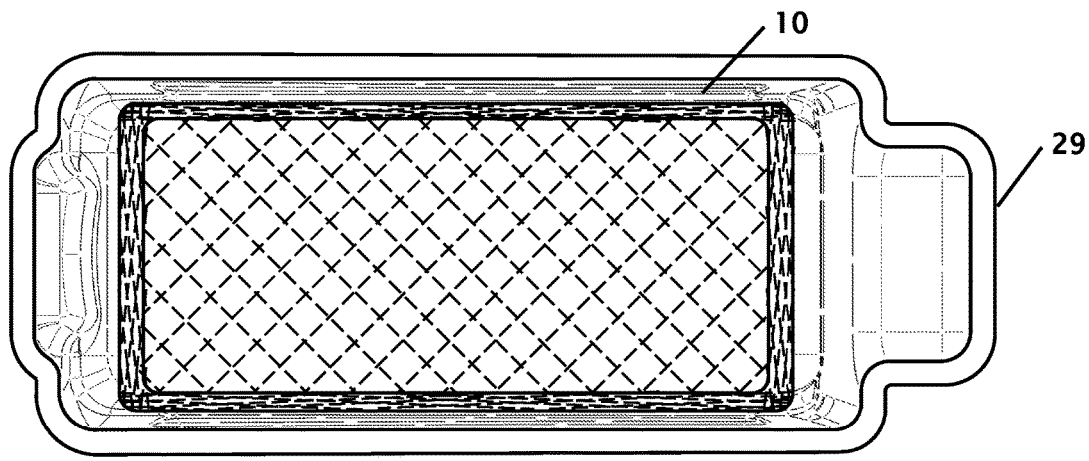

FIG. 9A-9C are perspective views of another contemplated embodiment to the utility liner 29. The basket utility liner 29 is ideally molded to perfectly fit the processing basket 10. The basket utility liner 29 is preferably thin and made of plastic. This illustration shows a possible minimal deviation from the processing basket 10 disposable utility lining system shape without sacrificing accessibility to the cassette-smear assembly. FIG. 9B shows a slide 31 and a robotic arm 32.

Figure 10A:
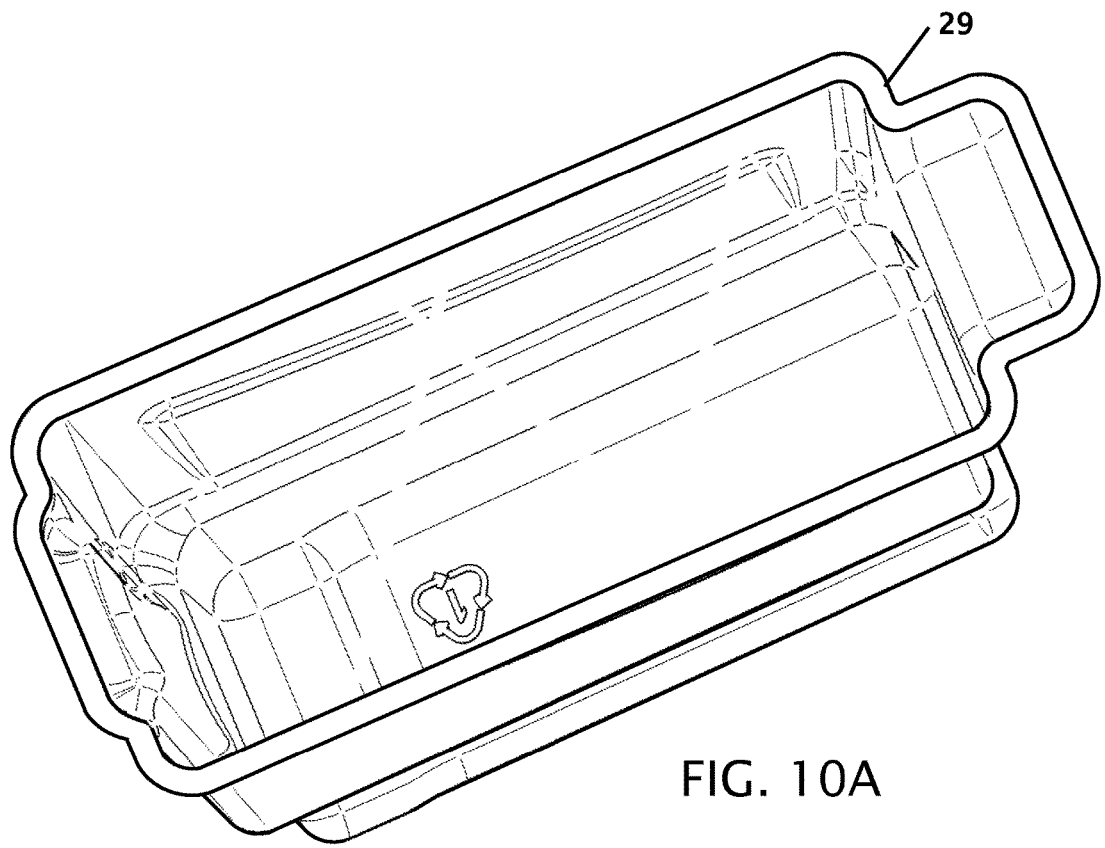
FIG. 10A is a top 3D view of the basket utility liner.
Figure 10B:
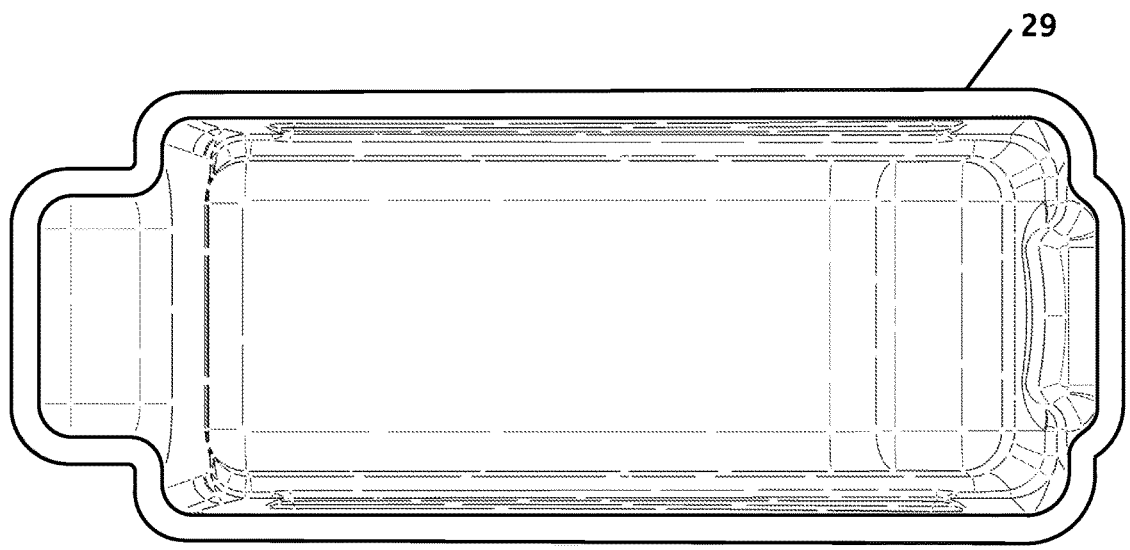
FIG. 10B is a top view of the basket utility liner.
Figure 10C:
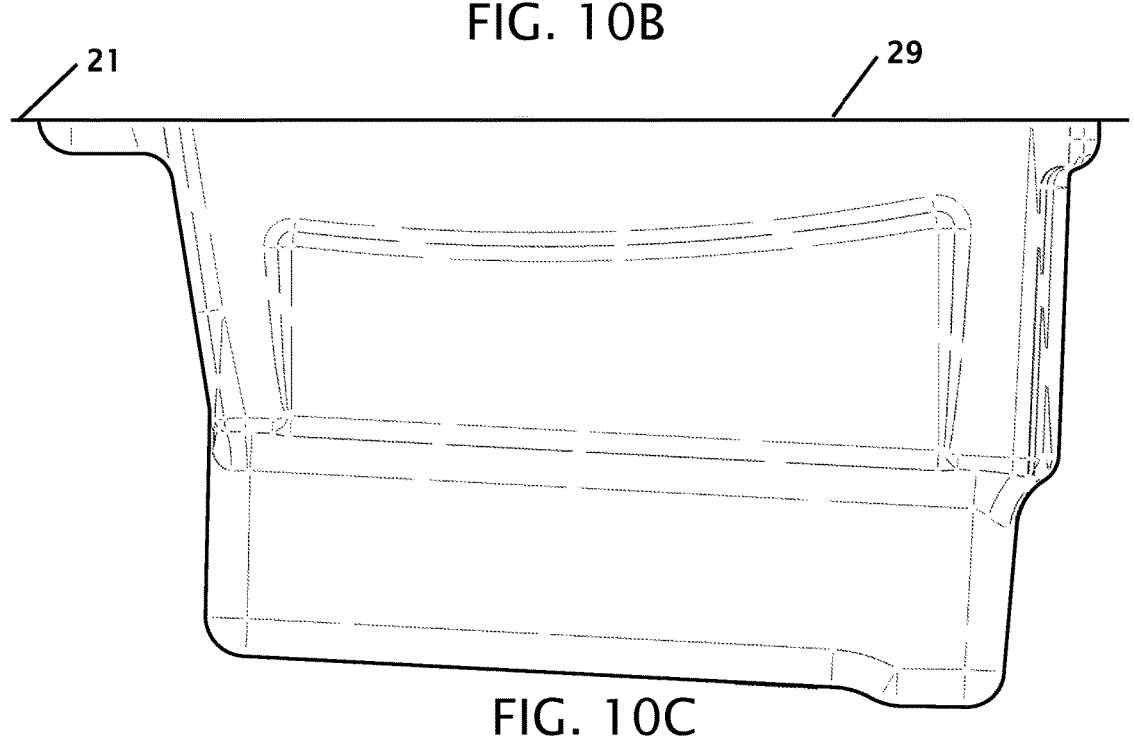
FIG. 10C is a side view of the basket utility liner.

FIG. 10A is a top 3D view of the basket utility liner, FIG. 10B is a top view of the basket utility liner 29 and FIG. 10C is a side view of the basket utility liner 29. In this view, the lip 21 of the basket utility liner 29 is shown. The lip extends over the side walls of the processing basket 10 to prevent fluids from entering into the processing basket 10 thereby requiring the processing basket 10 to be cleaned.

Figure 11:
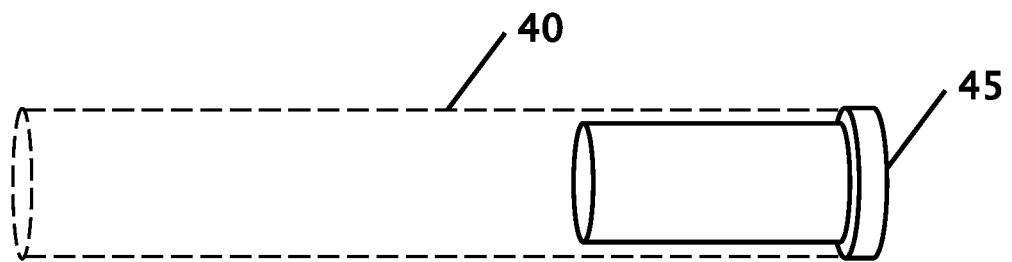
FIG. 11 is a perspective view, showing the drain probe and the cover assembly.

FIG. 11 is a perspective view, showing the drain probe 45 and the cover assembly 40.

Figure 12:
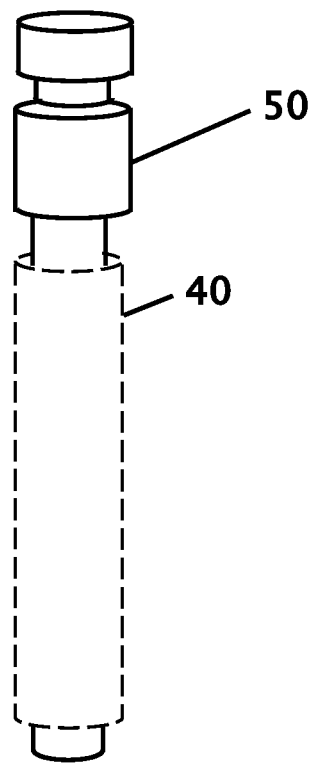
FIG. 12 is a schematic view, showing the dispense-fill probe and the cover assembly.

FIG. 12 is a schematic view, showing the dispense-fill probe 45 and the cover assembly 40. It should be noted that the probe sensor region at the bottom of the probe sensor is not covered.

Figure 13:
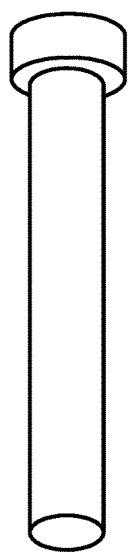
FIG. 13 is a perspective view, showing the drain probe with the cover.

FIG. 13 is a perspective view, showing the drain probe 50 with the cover 40.

Figure 13A:
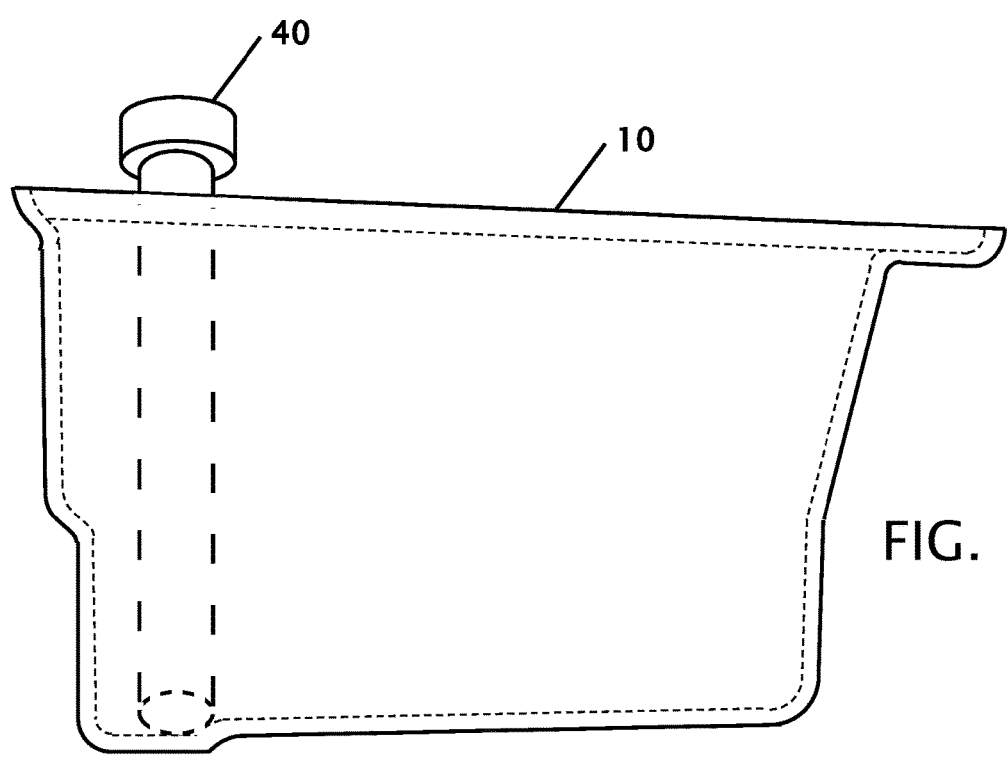
FIG. 13A is the left side view of the preferred embodiment showing the drain probe cover assembly with the drain probe cover dipped in the basket as designed.

FIG. 13A is the left side view of the preferred embodiment showing the drain probe 50 cover 40 with the drain probe cover dipped in the processing basket 10 as designed.

FIG. 14 is a perspective view, showing the dispense probe 55 with the cover 40.

FIG. 14A is the right-side view of a preferred embodiment showing the dispense/fill probe 45 cover 40 assembly with the dispense/fill probe 45 with cover 40 dipped in the processing basket 10.

Figure 15:
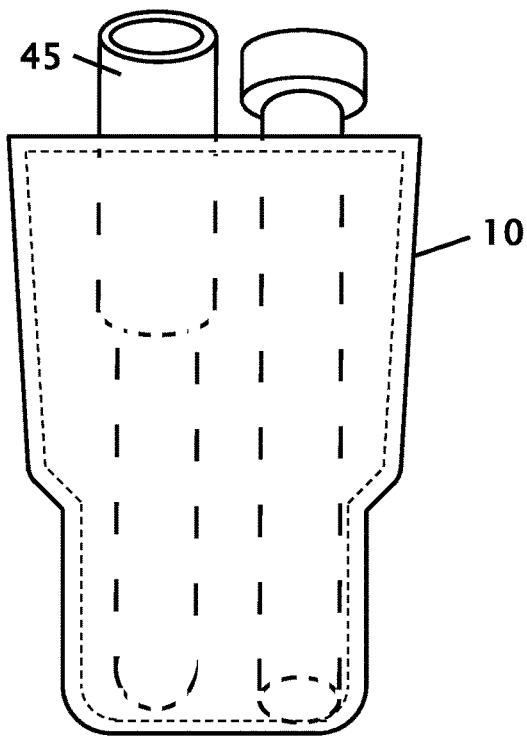
FIG. 15 shows the front view of the drain and dispense/fill probe inside the basket utility liner and the basket.

FIG. 15 shows the front view of the drain and dispense/fill probe 45 inside the basket utility liner and the processing basket 10.

Figure 15A:
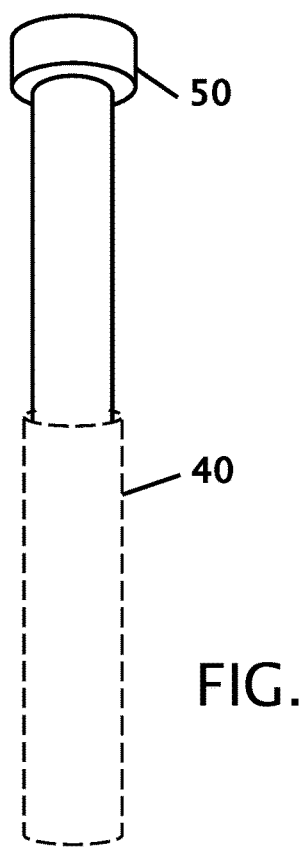
FIG. 15A shows the drain probe with the cover.

FIG. 15A shows the drain probe 50 with the cover 40.

Figure 15B:
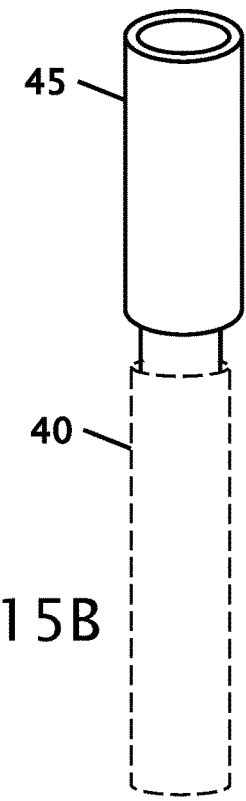
FIG. 15B shows the fill probe with the cover.

FIG. 15B shows the fill probe 45 with the cover 40.

The cleaning solution of methanol is the biggest hazard due to its classification which according to MSDS NO: 6000 Prepared by Alcohol QA, Technical Services, and Regulatory Affairs Department (909) 790-7500 Date Feb. 1, 2014 "Toxicological Data is flammable liquid and although practically non-toxic to animals, it is very toxic to humans.

The Notes to Physician during Emergency and First Aid procedure states that it is a very toxic substance, capable of producing blindness and death. The WHMIS Classification and Synergistic Materials is a flammable liquid, very toxic material and eye irritant. Unusual Fire and Explosion Hazards is associated with the vapors produced and may travel or be moved by air currents and ignited by pilot lights, other flames, sparks, heaters, electrical equipment, static discharges, and ignition sources at locations that are distal to the staining solution.

Thus, specific embodiments of a processing basket disposable utility lining system have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A disposable utility lining system with processing basket and probe cover comprising:
   a liner between a cassette basket and at least one reagent;
   said liner is fabricated from a material that does not create a chemical reaction with an intended reagent;
   a jacket between a probe and said at least one reagent;
   said liner being configured to fit within or covering an outside of a receptacle, and
   said liner having a clearance area for a robotic arm that transfers a slide from a first step to a second step of a slide making-staining process.

2. The disposable utility lining system with processing basket and probe cover according to claim 1, wherein said reagent is selected from a group consisting of Methanol, Phosphate Buffer, Wright's stain and a reagent having a biohazard Material Safety Data Sheet (MSDS) classification.

3. The disposable utility lining system with processing basket and probe cover according to claim 1, wherein said disposable liner is made of plastic.

4. The disposable utility lining system with processing basket and probe cover according to claim 1, wherein said utility liner minimizes or eliminates hazardous cleaning/maintenance process and reduces a risk of accidental exposure to biohazard chemicals.

5. The disposable utility lining system with processing basket and probe cover according to claim 1, wherein said utility liner is colored ranging from transparent to white, yellow, red to blue.

6. The disposable utility lining system with processing basket and probe cover according to claim 1, wherein said utility liner is used with fixing solutions, buffering solutions, staining solutions and rinsing solutions.

7. The disposable utility lining system with processing basket and probe cover according to claim 1, wherein said disposable utility liner has a lip that extends beyond said cassette basket.

8. The disposable utility lining system with processing basket and probe cover according to claim 1, wherein said disposable utility liner is between 0.002 and 0.020 inches thick.

9. A disposable utility lining system comprising:
   a liner between a cassette basket and at least one reagent;
   said liner is fabricated from a material that does not create a chemical reaction with an intended reagent;
   said liner being configured to fit within or covering an outside of a receptacle, and
   said liner having a clearance area for a robotic arm that transfer a slide from a first step to a second step of a slide making-staining process.

10. The disposable utility lining system according to claim 9, wherein said reagent is selected from a group consisting of Methanol, Phosphate Buffer, Wright's stain or a reagent having a biohazard Material Safety Data Sheet (MSDS) classification.

11. The disposable utility lining system according to claim 9, wherein said disposable plastic liner is made of plastic.

12. The disposable utility lining system according to claim 9, wherein said utility liner minimizes or eliminates hazardous cleaning/maintenance process and reduces a risk of accidental exposure to biohazard chemicals.

13. The disposable utility lining system according to claim 9, wherein said utility liner is colored ranging from transparent to white, yellow, red to blue.

14. The disposable utility lining system according to claim 9, utility liner is used with fixing solutions, buffering solutions, staining solutions and rinsing solutions.

15. The disposable utility lining system according to claim 9, wherein said disposable utility liner has a lip that extends beyond said cassette basket.

16. The disposable utility lining system according to claim 9, wherein said disposable utility liner is between 0.002 and 0.020 inches thick.

* * * * *